(12) United States Patent
D'Addario et al.

(10) Patent No.: US 6,696,007 B1
(45) Date of Patent: Feb. 24, 2004

(54) MOLD AND PROCESS FOR PRODUCING DRUMHEAD MEMBRANES

(75) Inventors: James D'Addario, Old Westbury, NY (US); Steven T. Murray, Oak Beach, NY (US)

(73) Assignee: Innovative Automation, Inc., Farmingdale, NY (US)

( * ) Notice: Subject to any disclaimer, the term of this patent is extended or adjusted under 35 U.S.C. 154(b) by 1005 days.

(21) Appl. No.: 08/753,265

(22) Filed: Nov. 22, 1996

(51) Int. Cl.[7] .............................................. B29C 43/00
(52) U.S. Cl. ...................... 264/322; 264/292; 264/327; 264/522
(58) Field of Search .................... 264/292, 322, 264/327, 522

(56) References Cited

U.S. PATENT DOCUMENTS

| | | | |
|---|---|---|---|
| 3,244,780 A | * 4/1966 | Levey et al. | 264/89 |
| 3,272,057 A | * 9/1966 | Saito | 84/414 |
| RE26,415 E | 6/1968 | Ludwig | 84/411 |
| 3,527,855 A | * 9/1970 | Parvin et al. | 264/519 |
| 3,668,296 A | 6/1972 | Criscuolo | 84/414 |
| 4,101,628 A | * 7/1978 | Wiik | 264/325 |
| 4,244,266 A | 1/1981 | Hardy | 84/411 |
| 4,397,804 A | * 8/1983 | Medwed | 264/292 |
| 4,428,272 A | 1/1984 | Andre et al. | 84/413 |
| 4,500,277 A | * 2/1985 | Bullock et al. | 425/387.1 |
| 4,549,462 A | 10/1985 | Hartry et al. | 84/413 |
| 4,754,683 A | 7/1988 | Townsend et al. | 84/413 |
| 4,779,508 A | * 10/1988 | Beals | 84/414 |
| 4,803,024 A | * 2/1989 | Nilsson | 264/80 |
| 4,809,582 A | 3/1989 | Chang | 84/414 |
| RE33,685 E | 9/1991 | Andre et al. | 84/413 |
| 5,385,076 A | 1/1995 | Belli | 84/414 |
| 5,404,785 A | 4/1995 | Belli | 84/411 |
| 5,410,938 A | 5/1995 | Kurosaki et al. | 84/411 |
| 5,554,812 A | * 9/1996 | Donohoe | 84/413 |

* cited by examiner

*Primary Examiner*—Michael Colaianni
(74) *Attorney, Agent, or Firm*—Gerald T. Bodner

(57) ABSTRACT

A drumhead mold and process for making a plastic drumhead. The mold is structured to heat the drumhead collar area and maintain the battering surface cool to provide a drumhead with improved performance characteristics.

8 Claims, 6 Drawing Sheets

MOLD AND PROCESS FOR PRODUCING DRUMHEAD MEMBRANES

FIELD OF THE INVENTION

The present invention relates to percussion musical instruments, and in particular drums. More specifically, the invention relates to a process for making a drum head membrane and the drum head membrane resulting from the process.

BACKGROUND OF THE INVENTION

A variety of musical instrument drums exist such as bass drums, tympani drums, kettle drums, snare drums, tom-toms, etc. Although the various drums differ from each other in application and sound all require a battering or striking surface secured over a hollow generally cylindrical structure.

The sound generated by the particular drum results from the fundamental frequency overtones and resonance all of which are, in part, a function of vibration decay or dampening time.

The vibration decay or dampening time is determined by the structural characteristics of the drum such as the size and weight of the drum, the nature of the battering surface and the tension imposed on the battering surface.

In general, the battering surface is made of animal skin or synthetic polymer sheets held in tension. Generally the tension is applied by means such as adjustable lugs or turnbuckles secured to peripheral collars integrally formed with the drum head membrane.

One common method for producing drum head membranes from polymer sheets is a thermoforming process in which sheets of a polymer such as polyester usually 0.003 to 0.010 inch thick are placed in a mold and are subjected to the simultaneous application of heat and pressure. The resultant membrane is a flat, essentially circular surface with an integrally formed depending periphery or collar. In the formation process, heat is applied to the mold to raise the temperature of the polymer to the range of 250° F. to facilitate deformation of the polymer to properly form the collar.

It has been found that the thermoforming process has detrimental effects on the drum head membrane. The heat causes the polyester to shrink and become brittle.

SUMMARY OF THE PRESENT INVENTION

It is an object of the present invention to provide a process for the manufacture of polymer drumheads that avoids shrinkage and brittleness caused by existing processes.

It is a further object of the present invention to provide a process for the manufacture of drumheads and a resultant drumhead that is easier to tune, has a full fundamental tone and a wide range of upper partial harmonics.

To this end a new and improved mold and process is provided. The mold is comprised of a peripheral section in which heat is delivered in the range of 180° F.–230° F. and a central section in which a heat exchange system is located. Coolant, such as water, is delivered to the heat exchange system to maintain the temperature of the mold central surface exposed to the polymer in the range of 90° F.–130° F.

The process proceeds by inserting a polymer sheet between the mold sections, securing the mold sections together under pressure and applying heat to the mold. As heat is applied to the mold, coolant is circulated through the heat exchange system to maintain a relatively low temperature in the area of the membrane battering surface and at the same time deliver higher temperature heat to the peripheral collar area.

DESCRIPTION OF THE DRAWINGS

The present invention will be more fully understood when viewed with the following drawings wherein.

DESCRIPTION OF THE PREFERRED EMBODIMENT

The subject invention has application in the manufacture of polymer percussion surfaces and will be described as applied to circular drum head battering surfaces on which a collar is formed to facilitate securement of the drumhead to a drum.

Figure 1:
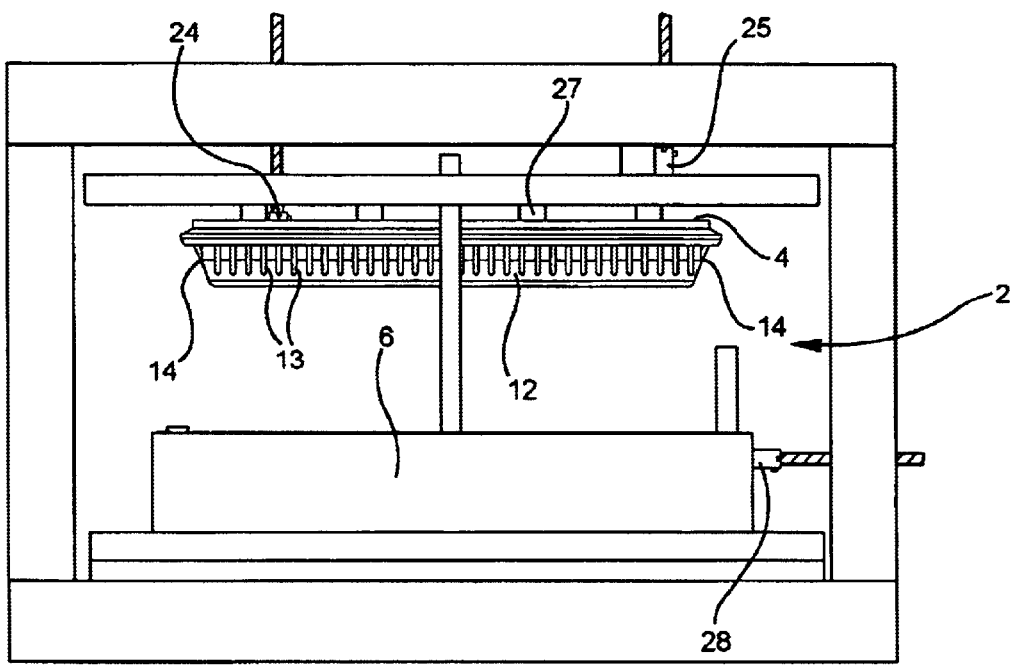
FIG. 1 is a side elevational view of the mold of the present invention shown in the open position.
Figure 2:
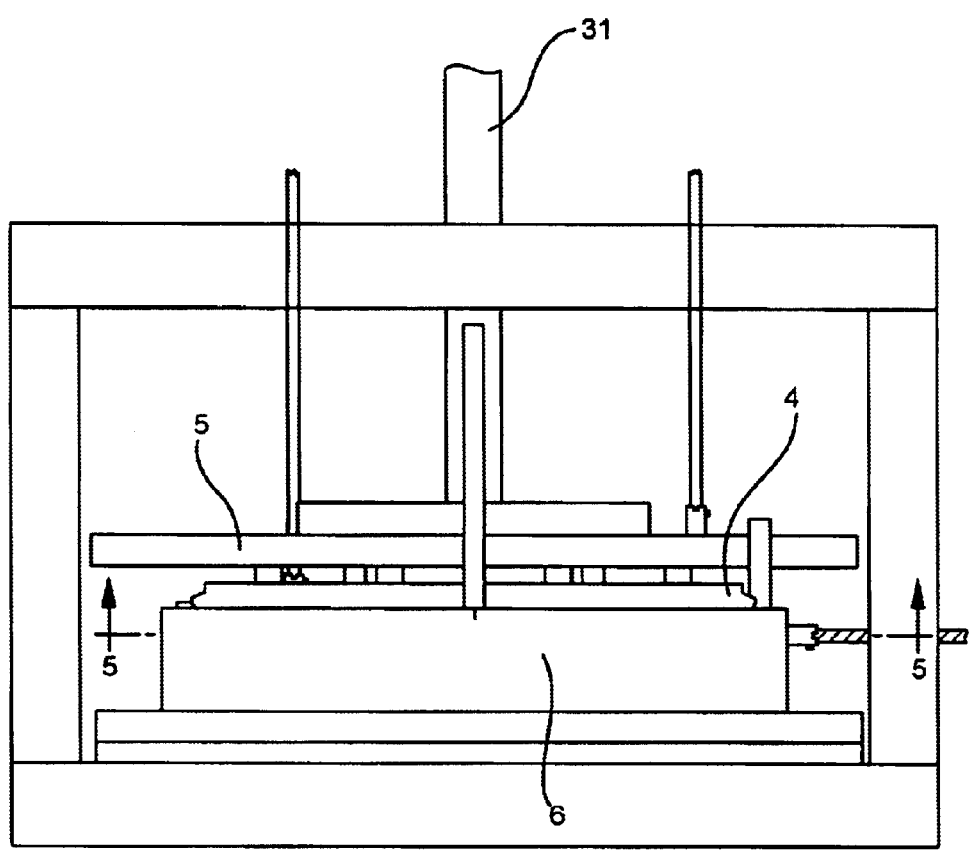
FIG. 2 is a side elevational view of the mold of the present invention shown in the closed position.
Figure 3:
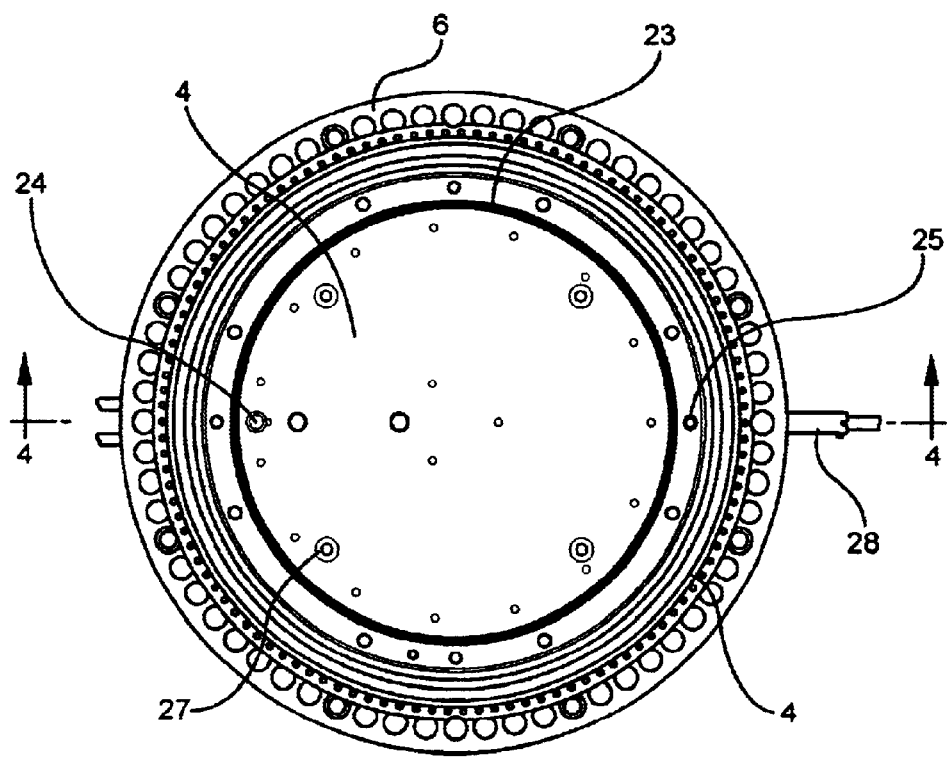
FIG. 3 is a top plan view of the mold as shown in FIG. 1.
Figure 6:
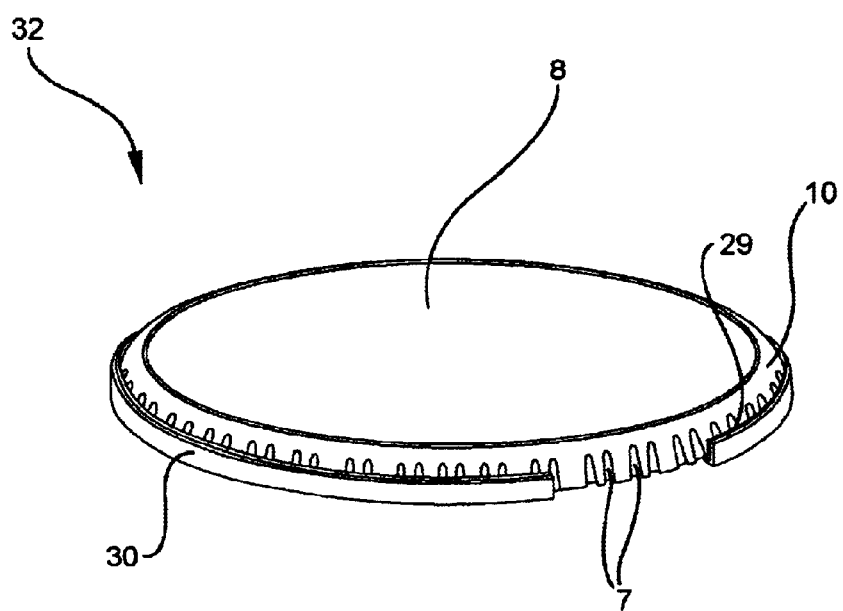
FIG. 6 is a perspective view of the assembled drumhead of the present invention.

As seen in FIGS. 1 and 2 a mold 2 comprised of an upper male member or upper mold (cone) 4 and a lower female member or lower forming die (cup) 6 is provided to form a drum membrane shown in FIG. 6 having a battering surface 8 and a peripheral collar 10.

As seen in FIG. 1, the male member or cone 4 is configured with an internal protruding circular surface 12 and an inclined continuous peripheral edge 14. The peripheral edge 14 has an array of pins 13 formed thereon. The female member or cup 6 is provided with a centrally disposed dished recess 16, best seen in FIG. 4, dimensioned essentially the same as the male protruding surface 12 and an inclined surface 15 configured to mate with the inclined peripheral edge 14 of the male mold member or cone 4. The peripheral edge 15 of the female mold member or cup 6 is provided with an array of slots 17 aligned with the pins 13 formed on the peripheral edge 14 of the male mold member or cone 4. The dished recess 16 is a flat plate 19 mounted on the rod 9 of the hydraulic piston (not shown). The flat plate 19 moves vertically while the inclined surface 15 is fixed.

Figure 4:
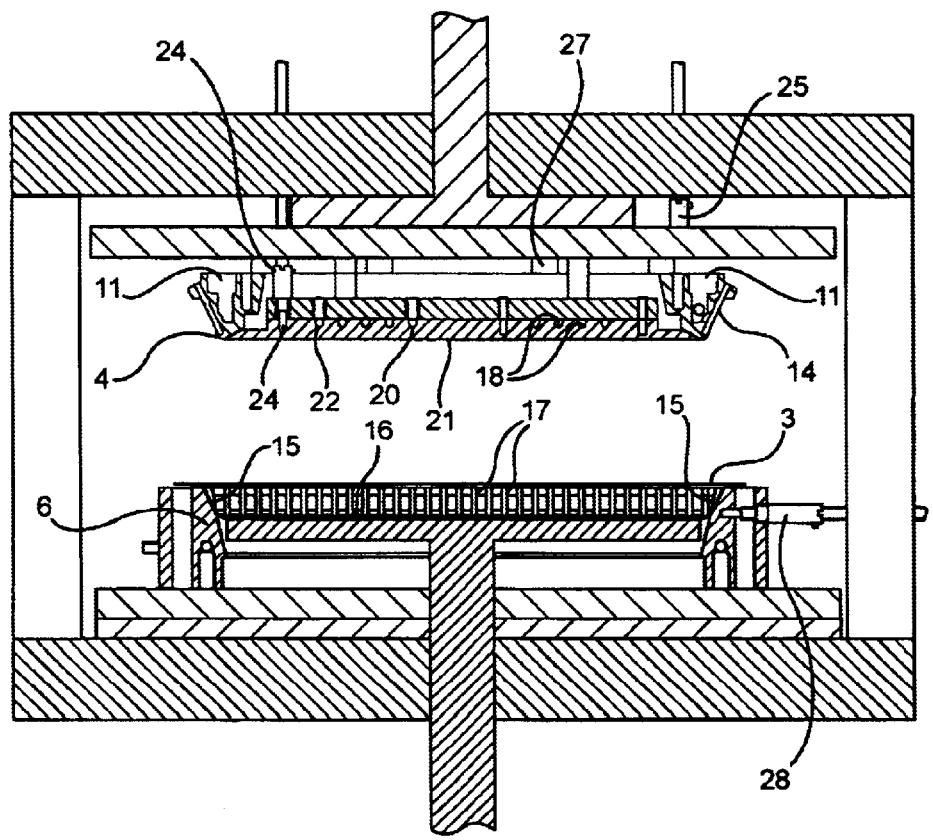
FIG. 4 is a sectional elevational view taken through line 4—4 of FIG. 3.

The male mold member 4 is also provided with a heating element 11 seen in FIG. 4, and a cooling or heat exchange system shown as a serpentine passage 18 having a coolant inlet 20 and an outlet 22 formed in a cooling plate 21. The heating element 11 is conventional and has long been used in processes for forming drumheads from polymers. In practice, the male mold member or cone 4 is mounted on a main mounting plate 5.

Temperature sensors in the form of thermocouples 24 are strategically positioned around the periphery of the male mold member 4 to regulate the temperature of the mold in the area of the serpentine passage 18 serving to cool the central area of the mold 2. In addition, a temperature sensor 25 in the form of a thermocouple is located in the male mold member 4 to insure a periphery temperature in the range of 180° F. to 230° F.

Figure 5:
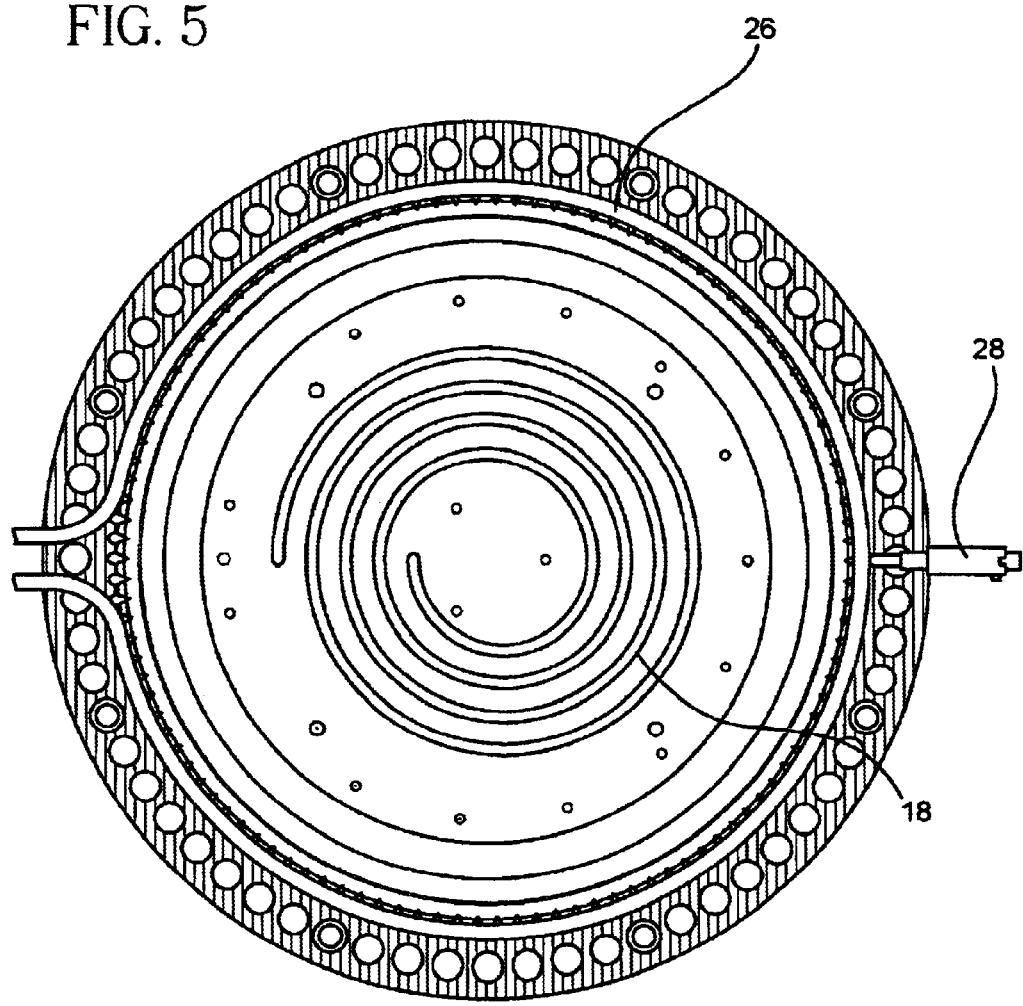
FIG. 5 is a sectional plan view taken through line 5—5 of FIG. 2.

The female mold member 6 is provided with an annular heater 26 and sensors in the form of thermocouples 28, best seen in FIG. 5, to facilitate temperature regulation of the mold 2 in the area of the mating inclined surfaces 14 and 15 that form the drumhead collar 10.

In the process of the present invention, a circular piece of polymer 3 shown in FIG. 4, preferably MYLAR polyester sized to extend uniformly beyond the inclined peripheral surface 15 of the female mold member 6 is placed on the interior of the female mold member 6. Thereafter, the male mold member 4 is brought into aligned engagement with the female mold member 6 to deform the polymer circular piece 3 to conform to the configuration of the mold 2. The temperature in the collar area is maintained at 180° F.–230° F. during the molding process. The temperature of the female member 6 in the area of the collar is maintained in the range of 130°–200° F. During the molding process the temperature of the center section of the polymer circular sheet 3 is kept at 90° F.–130° F. by delivery of coolant to the cooling passage 18. Practice shows that delivery of about one gallon per minute of water through the cooling passage 18 will maintain the proper temperature in the center of a polymer circular piece 3 having a diameter of fourteen inches.

The pressure imposed on the mold is external and in the range of 100 pounds of air pressure for a mold sized to produce drumheads for a fourteen inch drum. In the preferred embodiment, a hydraulic press 31 shown illustratively in FIG. 2, is used and cooling plate spacers 27 are provided to mount the cooling plate 23 on the male die member 4.

The residence time of the circular polymer sheet in the mold 2 is from thirty to one hundred eighty seconds depending of the size of the drumhead to be formed.

During the molding portion of the cycle, the lower inner pressure plate 19 pushes against the fixed inner cooling plate with force in the range of 20–60 PSI. The plate 19 is driven by a pneumatic cylinder (not shown). Practice has shown that the positive application of force against the cooling plate by the pressure plate 19 maintains the central portion of the polyester film(s) that ultimately become the vibrating area or battering surface 8 of the drumhead in a condition wherein it is held perfectly flat and kept cool during the forming process. The result is that the battering surfaces 8 vibrate better than the prior art battering surfaces.

The polymer sheet removed from the mold 2 after the forming process of the present invention, as seen in FIG. 6, has a circular battering surface 8 and a depending collar 10. The collar 10 is formed with dimples 7 formed by the pins 13 on the male mold member 4 and slots 17 on the female member 6 during the molding process. A conventional tensioning ring 30, usually aluminum, is secured to the edge of the collar 10 by conventional adhesive such as solid resin 29 to form a completed drumhead 32.

The drumhead 32 of present invention has shown markedly noticeable improved characteristics. In particular, the drumhead 32 provides ease of tuning over prior art polymer drumheads. Drumheads 32 manufactured with the process of the present invention can be tuned to a musical pitch that is lower than drumheads made with prior art processes. This is a very important feature for all drumheads and is particularly evident when heads are used on tom-toms, where it is common for musicians to try to tune these drums to a very low pitch, while maintaining a musical tone.

The molds and process of the present invention can be used to form drumheads for any size drum. However, the rate of coolant flow and residence times may vary with the size of the drumhead being formed and the size of the mold required to form a particular size drumhead.

The process of the present invention is provided to produce drumheads from a single piece of polymer or a plurality of polymer sheets secured together. One common embodiment of a drumhead is comprised of two identical polymer sheets secured together at the edge by adhesive.

What is claimed is:

1. A process for forming a drumhead comprising the steps of subjecting the center section of a polymer sheet to a temperature in the range of 90° F. to 130° F. and subjecting the periphery of said polymer sheet to a temperature in the range of 180° F.–230° F. and imposing a force on the polymer sheet to form a flat central battering surface and a peripheral collar depending from the flat central battering surface.

2. A process as in claim 1 wherein the steps of forming the collar and center section are performed simultaneously and further comprising the step of applying pressure against the center section of the polymer sheet during the formation process.

3. A process as in claim 2 wherein the process is performed in a mold having a male and female member and wherein said female member has a centrally disposed plate arranged to move into and out of engagement with said male member under pressure in the range of 20–60 PSI.

4. A process for producing a drumhead comprising:
  a. inserting a polymer sheet in a mold having a peripheral section and a center section;
  b. delivering heat to the polymer sheet;
  c. cooling the mold only at the center section to maintain a temperature differential between the peripheral section and the center section; wherein the temperature at the peripheral section is higher than the temperature at the center section and
  d. forming the polymer sheet into a drumhead battering surface comprised of a flat battering surface and a peripheral collar depending from the flat battering surface to form the drumhead.

5. A process as in claim 4 further comprising the step of forming dimples in the drumhead depending collar.

6. A process as in claim 4 wherein the temperature at the peripheral section is in the range of 180° F. to 230° F. and the temperature in the center section is in the range of 90° F. to 130° F. and comprising the further step of applying positive pressure on the center section of the polymer sheet.

7. A process as in claim 6 wherein the polymer sheet is polyester and the coolant is water.

8. A process as in claim 6 further comprising the steps of inserting a plurality of secured together polymer sheets in,the mold.

* * * * *